United States Patent

[11] 3,562,578

[72] Inventor Michiaki Takahashi
Yokohama, Japan
[21] Appl No 818,358
[22] Filed Apr. 22, 1969
[45] Patented Feb. 9, 1971
[73] Assignee Victor Company of Japan, Limited
Yokohama, Japan
[32] Priority Apr. 25, 1968
[33] Japan
[31] 27380

[54] VERTICAL DEFLECTION CIRCUIT OF TELEVISION RECEIVER
14 Claims, 11 Drawing Figs.

[52] U.S. Cl. .......... 315/27, 315/19
[51] Int. Cl. .......... H01j 29/76
[50] Field of Search .......... 315/27, 19, 27VDR, 27LC

[56] References Cited

UNITED STATES PATENTS

| | | | |
|---|---|---|---|
| 2,768,325 | 10/1956 | Janssen | 315/VDR |
| 3,174,073 | 3/1965 | Massman et al. | 315/27LC |
| 3,320,470 | 5/1967 | Janssen | 315/27VDR |
| 3,377,501 | 4/1968 | Janssen | 315/27VDR |

*Primary Examiner*—Richard A. Farley
*Assistant Examiner*—Brian L. Ribando
*Attorney*—Holman & Stern

ABSTRACT: A vertical deflection circuit of a television receiver having a transformer of which a primary winding is connected to a collector of a vertical deflection output transistor, a thermosensitive resistance element such as a thermistor which is connected between a second winding of the said transformer and a base of the said transistor. The thermosensitive resistance element controls a direct current bias to a base of the transistor and at the same time, controls feedback quantities of an alternating current positive feedback to the base of the transistor.

INVENTOR
Michiaki Takahashi

BY Holman, Glascock, Downing & Seebold
ATTORNEYS

INVENTOR
Michiaki Takahashi

BY Holman, Glascock, Downing + Seebold
ATTORNEYS

INVENTOR
MICHIAKI TAKAHASHI

BY Holman, Glascock, Downing & Seebold
ATTORNEYS

VERTICAL DEFLECTION CIRCUIT OF TELEVISION RECEIVER

The present invention relates to a vertical deflection circuit of a television receiver and particularly to a vertical deflection circuit capable of automatically correcting variations of an input-output characteristic caused by changes of temperature of a vertical deflection output transistor.

Generally speaking, in the case of the vertical deflection circuit of the television receiver incorporated with transistors, a rise-up portion of the characteristic curve of the transistor is used and the circuit is operated with the positive application of its nonlinear 2,739,695. Further, in the case when the operating point of the transistor is changed by the temperature variation, this causes changes of the linearity and the amplitude of the image picture and leads to undesirable effects. And further, in the case when the cutoff point of the input of the transistor is changed by the changes of temperature, with this change, the gradient of voltage-current characteristic is also affected by the changes of temperature and accordingly, even if the alternating current input is kept constant, the collector output current is provided with components of a direct current variation and an alternating current variation.

A conventional vertical deflection circuit has been in existence, in which such thermosensitive resistance elements as varisters, thermistors etc. are used, and the change of the characteristics of the transistors affected by the temperature variation is corrected by automatically correcting the bias voltage leading to the base of the transistor. As described in the following paragraphs, in this known circuit, the correction of the alternating current (AC) variation components could not be conducted in a sufficient manner and accordingly, the peak value of the collector current is changed and the amplitude and the linearity is detrimentally affected. Furthermore, for a silicon transistor, the values of $\partial V_{BE}/\partial T$, , the change of input voltage $^{V}$BE in accordance with temperature T, range in the limit of − 2.0 to − 2.5 mV° C. C, and these values run above values of a germanium transistor in which the change of its thermal characteristics being ranged from − 1.8 to − 2.2 mV/° C. C. Of the silicon transistor the change $\partial I_B/\partial V_{BE}$ of the base current $I_B$ in accordance with the input voltage $V_{BE}$ runs above the corresponding values of the germanium transistor. Accordingly, in the case when the silicon transistor is used as the above mentioned transistor, more appreciable change of the operating point by the change of temperatures is observed and therefore, more appreciable change of the collector current in accordance with the predetermined input is observed.

The present invention has been worked out for elimination of the above defects of the conventional circuit.

The primary object of the present invention is to provide an improved vertical deflection circuit which is available for correcting at the same time amplitude changes and linearity changes of an image picture in accordance with temperature changes in a television receiver.

Another object of the present invention is to provide a vertical deflection circuit of a television receiver which is available for automatically correcting changes of characteristics of a vertical deflection output transistor in accordance with changes of temperature in direct current components as well as in alternating components.

Another object of the present invention is to provide a vertical deflection circuit of a television receiver which is available for correcting changes of a direct current bias operating point of a vertical deflection output transistor in accordance with changes of temperature and at the same time, for correcting variation of a gradient of input characteristics.

A further object of the present invention is to provide a vertical deflection circuit of a television receiver which is available for correcting a direct current operating point of a vertical deflection output transistor in accordance with changes of temperature and at the same time, for perfect compensation of temperature by means of positive feedback of an alternating current signal.

A still further object of the present invention is to provide a vertical deflection circuit of a television receiver which is available for correcting automatically positive feedback quantity of alternating current signals in a vertical deflection output transistor in accordance with changes of temperature and further for compensating alternating current variation components.

A still further object of the present invention is to provide a vertical deflection circuit of a television receiver which maintains the balance of compensating quantity of direct current bias of a vertical deflection output transistor and compensating quantity by alternating positive feedback.

Other objects and distinctive features of the present invention will be apparent from the following detailed description in connection with the accompanying drawings, in which.

Figures 9, 10, 11:
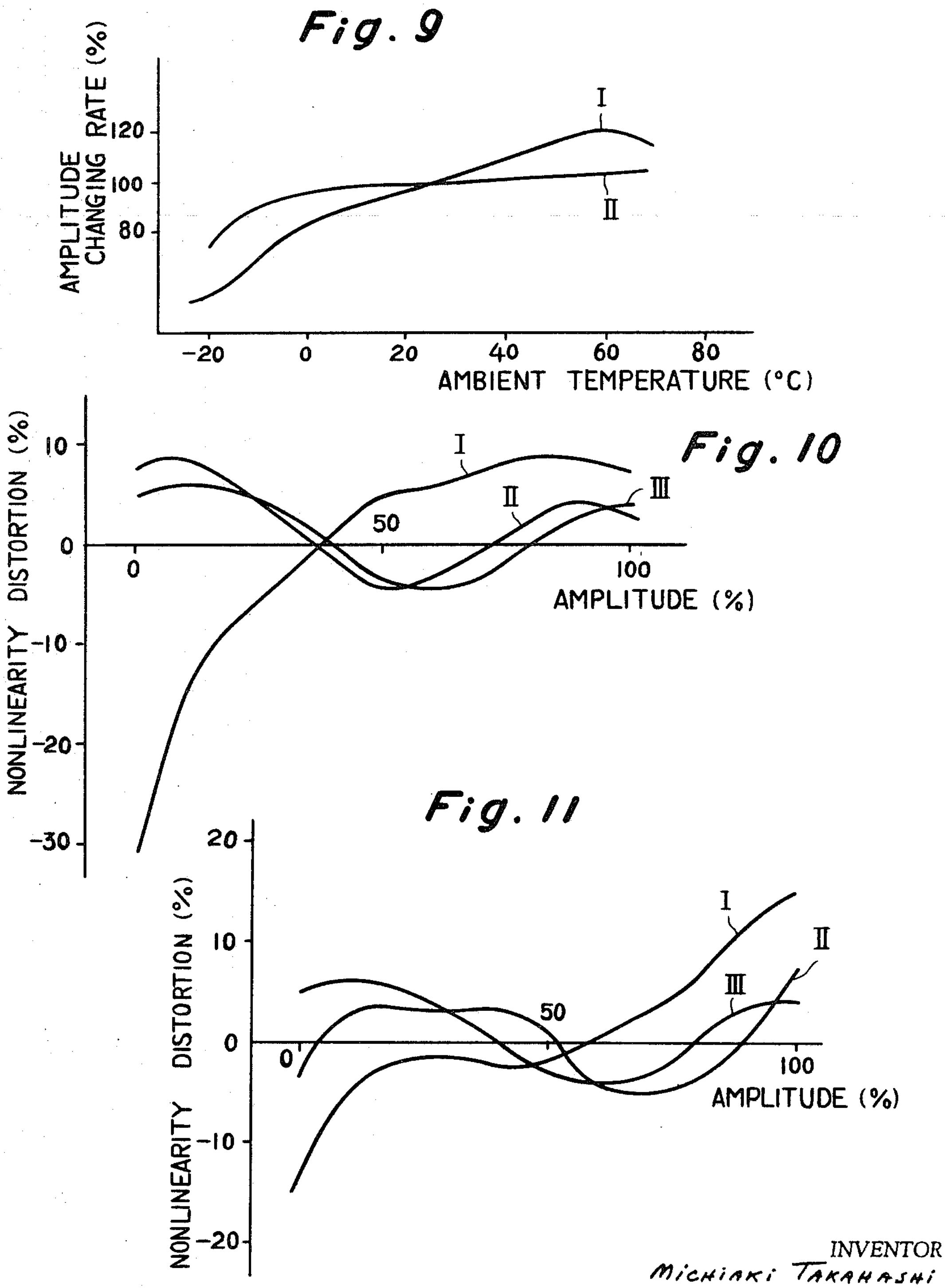
FIG. 9 is a graphical representation of thermal characteristics of the amplitude.

FIG. 10 and FIG. 11 graphically represent changes of the linearities in accordance with the amplitude at the temperatures of 0° C. and 50° C. respectively.

Figures 1, 2, 3:
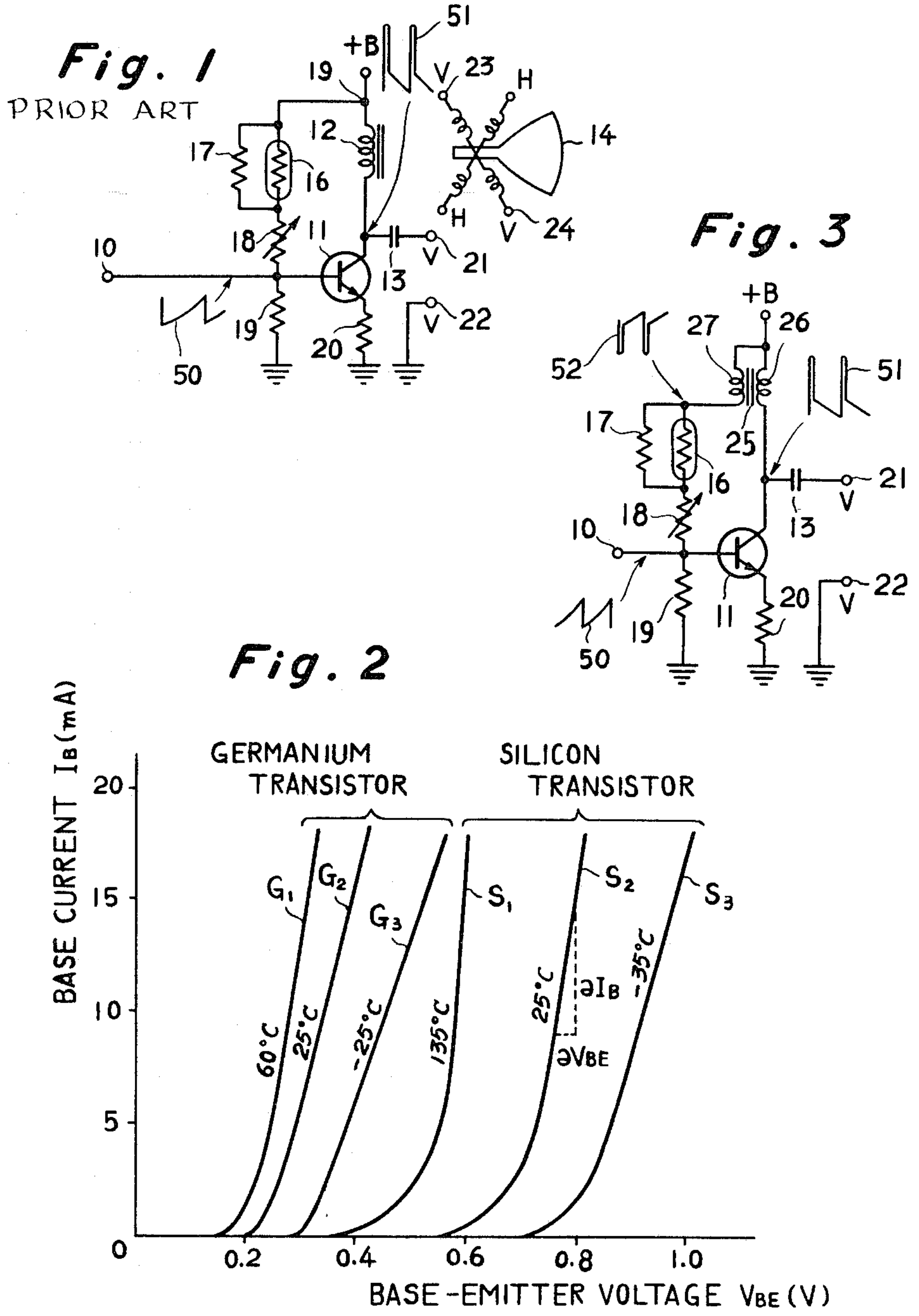
Fig. 1 PRIOR ART, Fig. 2, Fig. 3
FIG. 1 is a circuit diagram of a conventional vertical deflection circuit of a television receiver.
FIG. 2 shows characteristic curves of base-emitter voltage versus base current of a generally used silicon transistor and a germanium transistor.
FIG. 3 through FIG. 7 are respectively the first embodiment through the fifth embodiment of the present invention.

The conventional vertical deflection circuit in the television receiver was constructed in such a circuit shown in FIG. 1. In the drawing, a saw-toothed wave 50 supplied from an input terminal 10 which is connected to a saw-toothed wave generating circuit is applied to a base of a vertical deflection output NPN transistor 11. A collector of the transistor 11 is connected to a direct current electric power source (+ B) by way of a choke coil 12. The collector output of the transistor 11 as represented by a waveform 51 is supplied, by way of a capacitor 13, to one end of a vertical deflection coil 15 of an image receiving tube 14. Terminals 21 and 22 are respectively connected to terminals 23 and 24 of the coil 15. A parallel circuit of a positive characteristic thermistor 16 and a resistor 17 and a variable resistor 18 which is connected in series to the said parallel circuit are connected between a point 19 on the power source (+ B) side of the choke coil 12 and the base of the transistor 11. The positive characteristic thermistor means a thermistor the resistance of which has a positive temperature coefficient. 19 and 20 represent the resistors. The thermistor 16 is arranged in a position available to be sensitive to the temperature of the transistor 11 in its operating time. To the base of the transistor 11, the direct current voltage (+ B) is applied as a direct current bias, after being divided by a resistor 19 and the thermistor 16, resistors 17 and 18. In accordance with the changes of the operating temperature of the transistor 11, the resistance value of the thermistor 16 is changed and the base bias of the transistor 11 is automatically adjusted and the transistor 11 is controlled in order that no variation will be created in the collector current.

FIG. 2 represents a graphical representation of characteristic curves of the voltage between base and emitter versus the base current, with parameters of temperature. The curves $S_1$, $S_2$ and $S_3$ represent characteristics of a silicon transistor at the temperatures of 135° C., 25° C. and − 35° C. respectively. Further the curves $G_1$, $G_2$ and $G_3$ represent characteristics of a germanium transistor at the temperatures of 60° C., 25° C. and − 25° C. As it is obvious from these curves, the gradient i.e. the ratio of the input voltage and the base current at the point where the characteristic curve of the transistor takes an abrupt rising-up, is affected by the changes of temperature. Accordingly, in the case when the operating temperature changes under the condition that the transistor 11 shown in FIG. 1 is supplied with the constant input signal 50, even if the positive characteristic thermistor 16 adjusts the direct current operating point and such control is provided that the mean value of the collector current of the transistor 11 becomes constant, the peak value of the collector current varies without being maintained constant and accordingly, the alternating current output is made to change. In accordance with the above situation, in the conventional circuit, it is accompanied by a deficiency that a perfect temperature compensation could not be made.

FIG. 3 shows a circuit diagram of the first embodiment of the present invention. The same portions of the said circuit as is identical with that of the circuit in FIG. 1 is given with the same numerals and detailed description of the portion has been omitted. The collector of the vertical deflection output transistor 11 is connected to one end of a primary winding 26 of a transformer 25. The other end of the said primary winding is connected to the direct current electric source (+ B) and also, to one end of a secondary winding 27 which is of an opposite polarity with the primary winding 26. Between the other end of the said winding 27 and the base of the transistor 11, the parallel circuit of the thermistor 16 and the bias resistor 17 and the variable resistor 18 connected in series with the said parallel circuit are connected. Accordingly, to the base of the transistor 11, the direct current bias voltage is supplied by way of the secondary winding 27 from the direct current electric source and at the same time, the alternating signal positively fed back from the collector side is supplied from the secondary winding 26.

In accordance with the variation of the operating temperature of the transistor 11, the positive thermistor 16 controls in an automatic manner the direct current operating point of the said transistor and at the same time, controls the quantity of the positive feedback of the alternating signals. Upon increase of the surrounding temperature of the transistor 11 which is set for normal operation at the normal temperature, the resistance value of the positive characteristic thermistor 16 is increased and the base voltage of the said transistor lowers and thus, the increase of the direct current of the collector is suppressed and at the same time, this effect decreases the feedback quantity of the alternating positive feedback and thus the increase of the peak value of the collector current is suppressed. Consequently, the output of the collector of the transistor 11 is maintained constant in direct current and in alternating current without being affected by the variations of temperature and accordingly, the vertical deflection output can be kept constant, keeping also constant the amplitude and the linearity of the television image picture.

Figure 4:
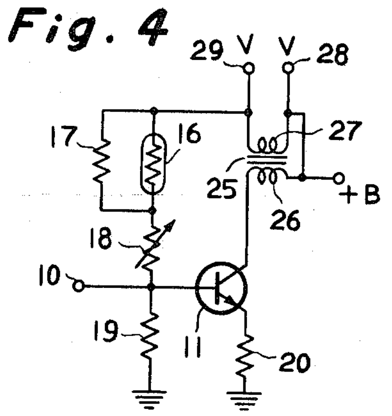

FIG. 4 shows a circuit diagram of the second embodiment of the present invention. In this embodiment, terminals 28 and 29 are provided on both sides of the secondary winding of the transformer 25. Both terminals 28 and 29 are connected to the vertical deflection coil of the image-receiving tube. In accordance with the present practical embodiment, it becomes available to choose the output impedance in an appropriate manner and employ selectively the above first embodiment shown in FIG. 3 or this present embodiment shown in FIG. 4 depending upon the impedance of the load.

Figure 5:
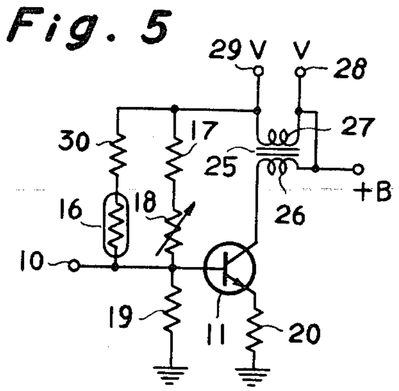

FIG. 5 shows a circuit diagram of the third embodiment of the present invention. In this particular circuit, the series circuit consisting of the resistor 17 and the variable resistor 18, the series circuit consisting of a resistor 30 and the thermistor 16 are connected in parallel and the parallel circuit is connected between the secondary winding 27 of the transformer 25 and the base of the transistor 11. In the above embodiment shown in FIG. 4, upon regulation of the resistance values of the variable resistor 18, it so detrimentally affected that the sensitiveness of the thermistor 16 with respect to the base voltage is also made to change. Contrary to these detrimental characteristics, in this third embodiment the connection is made in the above manner, so that even if any adjustment is made on the variable resistor 18, the thermistor 16 remains without being affected by this adjustment.

Figures 6, 7, 8:
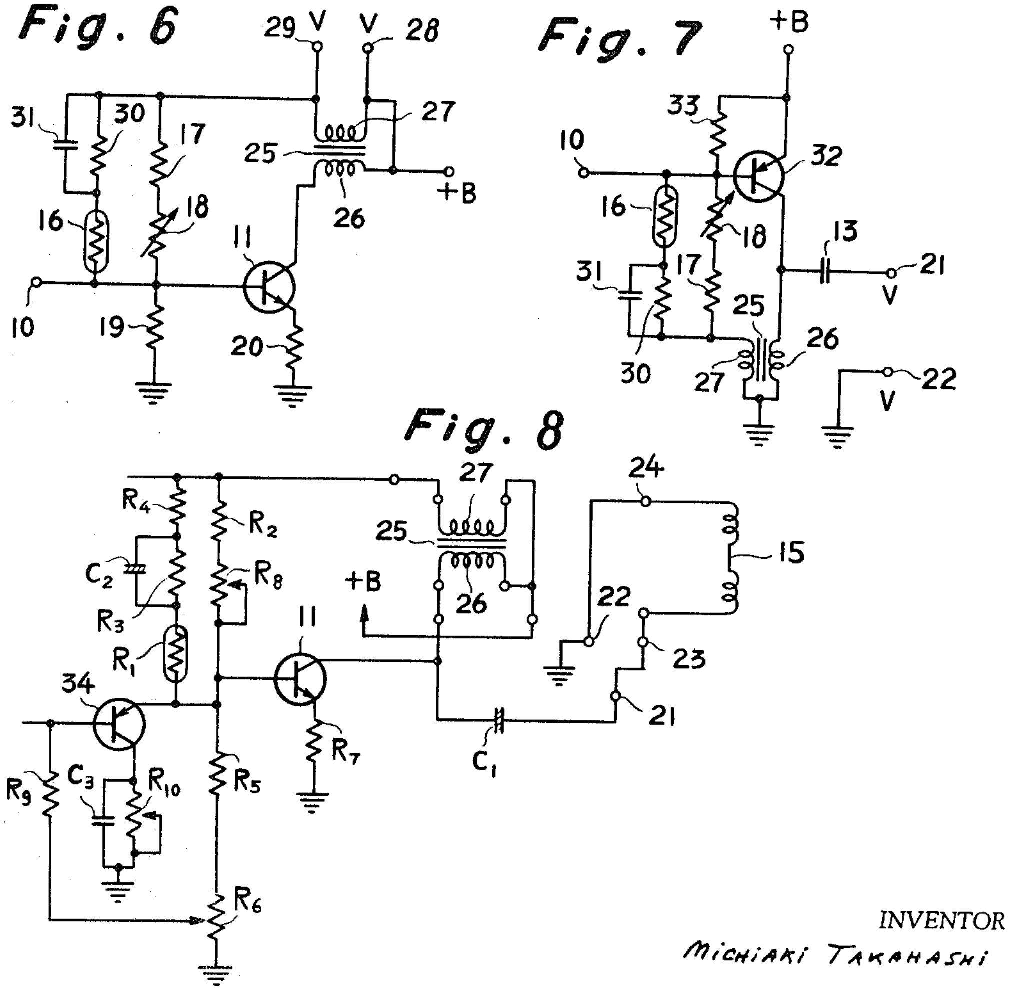
FIG. 8 is a circuit diagram of a furthermore specific and practical example of the circuit embodying the present invention.

FIG. 6 shows a circuit diagram of the fourth embodiment of the present invention. In the positive characteristic thermistor 16, in accordance with its characteristics, the resistance changing rate, at the lower temperature with respect to the standard resistance value is lower than the resistance changing rate at the higher temperature and the gradient $\partial I_B/\partial V_{BE}$ of the input of the transistor 11 at the low temperature, especially at the temperature below the freezing point takes gentle trend. Consequently, when the circuit is operated at the low temperature, even if the direct current operating point of the base is corrected by the thermistor 16, the collector peak current decreases and larger alternating feedback must be given to the base for correcting the alternating output.

In this embodiment, in recognition of this point, in the circuit shown in FIG. 5, the circuit is constructed in such a way that in parallel with the resistor 30 which is connected in series to the thermistor 16, an appropriate capacitor 31 is connected and in this way, in the proper low temperature at the suitable direct current bias point in low temperature, an alternating positive feedback larger than the case of the third embodiment shown in FIG. 5 is obtained. Consequently, upon correcting the direct current operating point in accordance with the temperature change from the low temperature to the high temperature, even if the alternating positive feedback runs short in quantity, the variable adjusting range of the alternating positive feedback becomes enlarged by means of the capacitor 31 connected in series with the thermistor 16 and the unbalanced condition of the corrected quantity of the base direct current bias and the corrected quantity of the alternating positive feedback is eliminated, and finally the stabilization of the circuit operation is brought.

FIG. 7 shows a circuit diagram of the fifth embodiment of the present invention. In this embodiment, as the vertical deflection output transistor, a PNP transistor 32 is employed and between its corrector and base, a similar circuit as the circuit represented in FIG. 6 is connected. However, the connection point of the primary winding 26 and the secondary winding 27 of the transformer 25 is grounded and further, the emitter of a transistor 32 is connected to the direct current electric source (+ B) and further, between the emitter and the base a resistor 33 is connected. The deflection output is drawn out from the terminals 21 and 22.

FIG. 8 shows a circuit of a practical embodiment of the circuit construction similar to the embodiment as shown in FIG. 6. However, the vertical deflection output is drawn at the terminals 21 and 22 from the collector of the transistor 11, by way of the capacitor $C_1$, in the similar way as the embodiment shown FIG. 3. The resistors $R_1$ through $R_10$ and capacitors $C_1$ through $C_3$ are provided with the resistance values and capacitance values as shown in the following:

| | |
|---|---|
| Resistor: | |
| $R_1$ (Positive thermistor) | 6.8KΩ |
| $R_2$ | 2.2KΩ |
| $R_3$ | 18KΩ |
| $R_4$ | 2.2KΩ |
| $R_5$ | 18KΩ |
| $R_6$ (Variable resistor) | 10KΩ |
| $R_7$ | 6.8KΩ |
| $R_8$ (Variable resistor) | 5KΩ |
| $R_9$ | 3.9KΩ |
| $R_{10}$ (Variable resistor) | 200Ω |
| Capacitor: | |
| $C_1$ | 470μF |
| $C_2$ | 1μF |
| $C_3$ | 220μF |

The base of the transistor 11 is connected to the emitter of a vertical deflection oscillating transistor 34.

Those illustrations following FIG. 9 represent the comparison of the characteristics of the circuit illustrated in the embodiment shown in FIG. 8 with that of the conventional circuit.

FIG. 9 represents characteristic change of the amplitude in accordance with the change of temperatures; the axis of abscissas shows the ambient temperature (°° C. of the transistor and the thermistor; the axis of ordinates shows the amplitude changing rate (percentage) of the received image picture. As shown in FIG. 1, in the case when the temperature compensation is provided only to the thermistor 16, the characteristics are represented by a curve I, showing a large change of the amplitude in accordance with the temperature change. On the contrary, in accordance with the circuit embodying the present invention, the situation changes as shown in a curve I, showing almost no change of the amplitude even if the temperature changes.

FIG. 10 and FIG. 11 represent the nonlinearity distortion (percentage) with respect to the amplitude (percentage) on the image picture. In FIG. 10 we define the standard characteristic at 25° C. by a curve III and in the case when the temperature is lowered down to 0° C., the characteristic will be as shown by a curve I, if the conventional circuit represented in FIG. 1 is employed. From this fact it is obvious that this characteristic is greatly different from those represented by the curve III. Contrary to this situation, in the case when the new circuit embodying this present invention is employed, the characteristic becomes as represented by a curve II with the closest similarity with the characteristic represented by the curve III. Further, in FIG. 11, we define the standard characteristic at 25° C. by a curve III and in the case when the temperature is raised up to 50° C., the characteristic represented by the curve III will be as shown by a curve I, if the conventional circuit represented in FIG. 1 is employed. It is obvious that this characteristic is greatly different from that represented by the curve III. Contrary to this situation, in the case when the new circuit embodying this present invention is employed, the characteristic becomes as represented by a curve II with the closest similarity with characteristic represented by the curve III.

The circuit as described with reference to the accompanying drawings is of only embodiments of the present invention and may be modified in various ways without departing from the scope of the invention as defined in the appended claims.

I claim:

1. A vertical deflection circuit of a television receiver comprising a vertical deflection output transistor; a transformer having a primary winding connected on its one end to a collector of said transistor and a secondary winding connected to said primary winding in opposite polarity; a thermosensitive resistance element of which resistance value is changed in accordance with ambient temperature changes, said element being connected between said secondary winding of the transformer and a base of said transistor; and a circuit means drawing out a vertical deflection output from an appropriate position of a circuit connected on the collector side of said transistor, said output drawing out circuit means being connected to a vertical deflection coil of an image-receiving tube and being constructed to draw out the output by way of a capacitor from the collector of said transistor.

2. A vertical deflection circuit of a television receiver comprising a vertical deflection output transistor; a transformer having a primary winding connected on its one end to a collector of said transistor and a secondary winding connected to said primary winding in opposite polarity; a thermosensitive resistance element of which resistance value is changed in accordance with ambient temperature changes, said element being connected between said secondary winding of the transformer and a base of said transistor; a variable resistor connected in series to said thermosensitive resistance element between said secondary winding of the transformer and said base of the transistor; and a circuit means drawing out a vertical deflection output from an appropriate position of a circuit connected on the collector side of said transistor.

3. A vertical deflection circuit of a television receiver comprising a vertical deflection output transistor; a transformer having a primary winding connected on its one end to a collector of said transistor and a secondary winding connected to said primary winding in opposite polarity; a thermosensitive resistance element of which resistance value is changed in accordance with ambient temperature changes, said element being connected between said secondary winding of the transformer and a base of said transistor; a variable resistor connected in parallel to said thermosensitive resistance element between said secondary winding of the transformer and said base of the transistor; and a circuit means drawing out a vertical deflection output from an appropriate position of a circuit connected on the collector side of said transistor.

4. A vertical deflection circuit of a television receiver as claimed in claim 3 including a resistor connected in series to said thermosensitive resistance element and a capacitor connected in series to said thermosensitive resistance element and in parallel to said resistor.

5. A vertical deflection circuit of a television receiver comprising a vertical deflection output transistor; a transformer having a primary winding connected on its one end to a collector of said transistor and a secondary winding connected to said primary winding in opposite polarity; a thermosensitive resistance element of which resistance value is changed in accordance with ambient temperature changes, said element being connected between said secondary winding of the transformer and a base of said transistor; and a circuit means drawing out a vertical deflection output from an appropriate position of a circuit connected on the collector side of said transistor, wherein a joining point of the primary winding with the secondary winding of said transformer is connected to a direct current electric power source and an emitter side of said transistor is connected to a ground.

6. A vertical deflection circuit of a television receiver comprising a vertical deflection output transistor; a transformer having a primary winding connected on its one end to a collector of said transistor and a secondary winding connected to said primary winding in opposite polarity; a thermosensitive resistance element of which resistance value is changed in accordance with ambient temperature changes, said element being connected between said secondary winding of the transformer and a base of said transistor; and a circuit means drawing out a vertical deflection output from an appropriate position of a circuit connected on the collector side of said transistor, wherein a joining point of the primary winding with the secondary winding of said transformer is connected to a ground and an emitter of said transistor is connected to a direct current electric power source.

7. A vertical deflection circuit of a television receiver comprising a vertical deflection output transistor; a transformer having a primary winding and a secondary winding connected to said primary winding in opposite polarity, one end of the primary winding being connected to the collector electrode of said transistor; a positive characteristic thermosensitive resistance element of which resistance value is changed in accordance with ambient temperature changes of the operating transistor; a direct current electric power source; series circuit means for controlling a direct current bias to the base electrode of the transistor from said direct current power source and for controlling at the same time a feedback quantity of an alternating current component positively fed back to the base electrode of the transistor by way of said transformer from said collector electrode in accordance with changes of said temperature, said series circuit means including said secondary winding, said thermosensitive resistance element and at least one resistor across said direct current electric power source, said thermosensitive resistance element being connected between the secondary winding and the base electrode; and output circuit means for drawing out a vertical deflection output from the collector electrode of said transistor.

8. A vertical deflection circuit of a television receiver as claimed in claim 7 wherein said output circuit means is connected to a vertical deflection coil of an image receiving tube and is constructed to draw out the output by way of a capacitor from the collector of said transistor.

9. A vertical deflection circuit of a television receiver as claimed in claim 7 wherein said output circuit means is connected to a vertical deflection coil of an image receiving tube and is constructed to draw out the output from both ends of said secondary winding of the transformer.

10. A vertical deflection circuit of a television receiver as claimed in claim 7 wherein said series circuit means further includes a variable resistor connected in series to said thermosensitive resistance element between said secondary winding of the transformer and said base of the transistor.

11. A vertical deflection circuit of a television receiver as claimed in claim 7 wherein said series circuit means further includes a variable resistor connected in parallel to said thermosensitive resistance element between said secondary winding of the transformer and said base of the transistor.

12. A vertical deflection circuit of a television receiver as claimed in claim 11 wherein said series circuit means further includes another resistor connected in series to said thermosensitive resistance element and a capacitor connected in series to said thermosensitive resistance element and in parallel to said resistor.

13. A vertical deflection circuit of a television receiver as claimed in claim 7 wherein a joining point of the primary winding with the secondary winding of said transformer is connected to the direct current electric power source and an emitter side of said transistor is connected to a ground.

14. A vertical deflection circuit of a television receiver as claimed in claim 7 wherein a joining point of the primary winding with the secondary winding of said transformer is connected to a ground and an emitter of said transistor is connected to the direct current electric power source.